Jan. 31, 1956  J. H. HURDLE ET AL  2,732,872
COTTON HARVESTING SACK
Filed April 3, 1953  2 Sheets-Sheet 1
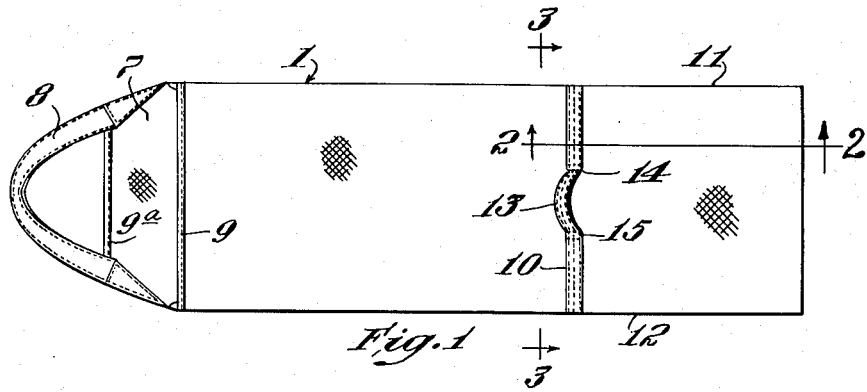
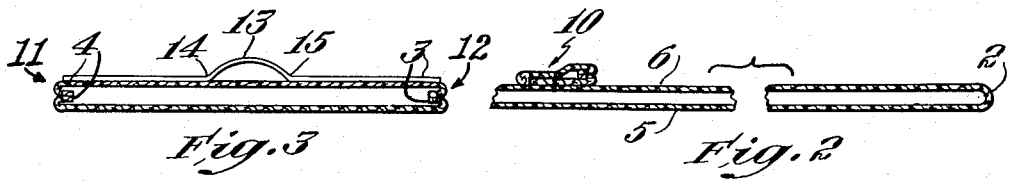
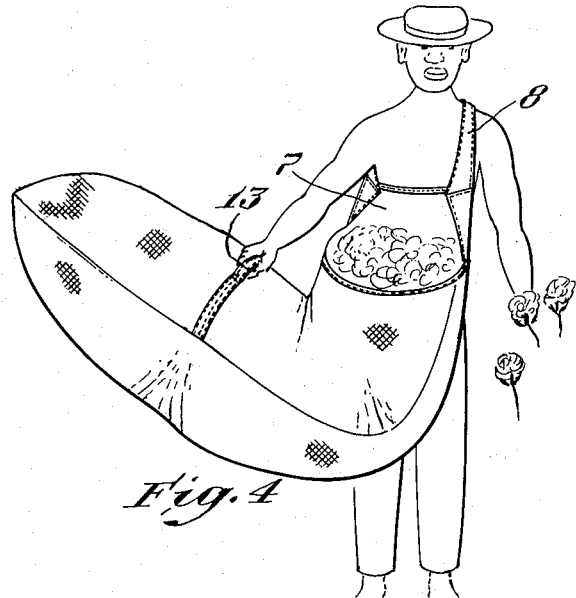
Inventors
Joseph H. Hurdle
John E. Curl
Ralph H. Curl
by Roberts Cushman & Grover
Att'ys.

Jan. 31, 1956  J. H. HURDLE ET AL  2,732,872
COTTON HARVESTING SACK
Filed April 3, 1953  2 Sheets-Sheet 2

Inventors
Joseph H. Hurdle
John E. Curl
Ralph H. Curl
by Roberts Cushman & Grover
Att'ys.

United States Patent Office 2,732,872
Patented Jan. 31, 1956

2,732,872

COTTON HARVESTING SACK

Joseph H. Hurdle, Holly Springs, Miss., John E. Curl, Collierville, Tenn., and Ralph H. Curl, Holly Springs, Miss.

Application April 3, 1953, Serial No. 346,684

4 Claims. (Cl. 150—2)

This invention pertains to harvesting receptacles and more especially to sacks of the type which are employed in the hand-picking of cotton.

In picking cotton by hand it is customary to provide the harvester with a long sack of cotton duck, or the like, closed at one end and open at the other and having a wide loop or shoulder strap at its open end which is placed over the shoulder of the worker so that as he moves along the cotton row his hands are free to pick the cotton and place it in the sack, the closed end of the sack resting on the ground and being dragged along as the picker proceeds along the row. When the sack is full, it may contain 70 lbs. thereabout of cotton, and because the lower wall of the sack is dragged along the ground and pressed down by the weight of the cotton, the lower wall of the sack is abraded by contact with the ground and wears rapidly.

Since the picker is paid according to the weight of cotton which he picks, it is necessary to weigh the bag when it has been filled. Weighing is customarily done in the field by the use of a spring scale or the like, supported, for example on a tripod, or on an arm carried by a truck.

One common form of sack has a grommet, or the like, at its closed end for convenience in suspending the sack from the scale hook. In preparation for weighing, two workers seize the opposite ends, respectively of the filled sack and bend the sack so as to bring the two ends nearly together, in order to permit the grommet at the closed end and the shoulder strap at the open end to be placed over the hook. Since at this time the bag is stuffed full, the force necessary to double the bag so as to bring its ends together, places a great strain on the bottom wall of the bag which is at the outside of the curve formed in bending the bag, and if the lower wall of the bag has become weakened by being dragged over the ground, the bag may burst when doubled up to place it on the scale hook. In fact, this is a very common occurrence. In ordinary field practice, a bag of the usual customary type lasts only about long enough to pick cotton to form two bales. Since the United States produces approximately fifteen million bales of cotton per year, it is evident that the replacement of harvesting sacks represents a very substantial item in the cost of cotton production.

The present invention has for one of its objects the provision of an improved cotton harvesting sack of such construction that its average life is substantially prolonged as compared with that of the usual sack. A further object is to provide a cotton harvesting sack so designed that during the weighing operation its walls are not subjected to so severe a strain as is exerted upon the walls of sacks of customary construction during the weighing operation.

A further object is to provide a cotton harvesting sack having provision, intermediate its ends, for attaching it to the hook of a weighing scale, thus lessening the stress imposed upon the wall of the sack in attaching the sack to the scale.

A further object is to provide a cotton harvesting sack having at a point intermediate its ends, a handle for convenience in lifting the filled sack and thereby facilitating its carriage to the weighing point.

A further object is to provide a cotton harvesting sack so designed that it may be suspended from a scale hook which is at a lesser elevation from the ground that is necessary when weighing a sack of the customary type, thus lessening the effort required in attaching the sack to the scale and permitting the use of a tripod or other scale support of lesser height than is customarily required.

Other and further objects and advantages of the invention will be pointed out in the following more detailed description and by reference to the accompanying drawings therein.

Fig. 1 is a plan view of a cotton harvesting sack embodying the present invention;

Fig. 2 is a fragmentary longitudinal section substantially on the line 2—2 of Fig. 1 and to somewhat larger scale;

Fig. 3 is a transverse section on the line 3—3 of Fig. 1;

Fig. 4 is a fragmentary elevation, illustrating in particular, the utility of the handle of the sack of the present invention in moving the sack from place-to-place;

Figure 8:
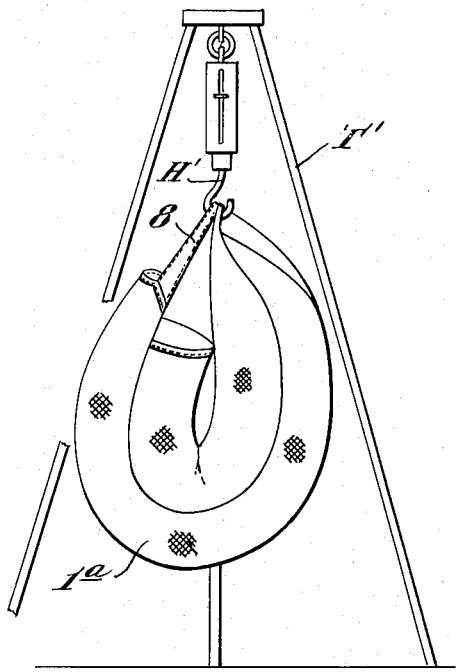
Fig. 8 is a view similar to Fig. 5, but illustrating, by way of contrast, the shape assumed by the customary sack during the weighing operation.

Referring to Figs. 1 to 3, the cotton harvesting sack of the present invention is indicated generally by the numeral 1. This sack, except as hereinafter specifically described, may be like the sacks customarily employed in the hand-picking of cotton. Such sacks are usually made of cotton duck and when flat and empty, as illustrated in Fig. 1, may, for example, be from about four to about ten feet long not including the top flap and strap and approximately two feet wide. Thus in a sack six feet long the ratio of width to length thus being of the order of 1:3. Usually the sack proper consists of a single length of cotton duck of appropriate width transversely folded upon itself to provide the closed bottom end 2 (Fig. 2), the lateral edges of the bottom and top plies 5 and 6 formed by the folding operation being seamed together, as indicated at 3 and 4 (Fig. 3). The upper end or mouth of the sack is left open, said open upper end being of customary construction and normal flexibility so that the upper end of the sack may be folded flat if desired, the upper end of the sack being devoid of stiffening means or other unusual adjuncts such as would tend to keep it open. Thus the user, in picking cotton, follows the practice with which he has long been familiar. The bottom ply or wall 5 is extended, at the open upper end, beyond the bag proper, to provide the flap 7 (Fig. 1), whose corner portions are doubled to provide a secure anchorage for the opposite ends of the shoulder strap 8. The upper edges of the upper ply or wall 6 and of the flap 7 are hemmed at 9 and 9a respectively, to provide a non-ravelling edge.

In one usual type of sack, one of the corners at the lower or closed end is folded over to provide a firm anchorage for a grommet for use in suspending the lower end of the sack from the hook of the weighing scale, but the sack of the present invention need not be provided with a grommet at its lower end.

In accordance with the present invention, a combined reinforce and suspending element is attached to the sack at a point intermediate the closed lower end 2 and the hem 9 at its open end. Desirably, the reinforce or suspending element is located between the lower end of the sack and the mid-point of the length of the sack, preferably at a point approximately one-third of the way from the closed end 2 to the hem 9, although this distance may be varied to some extent as experience may dictate.

One desirable form of reinforce or suspending element is illustrated in Figs. 1 to 3. It is provided by seaming a strong strap 10 of flexible material, for example, a multi-ply length of the same material as that of which the sack is made, to the upper wall 6 of the sack. This strap extends transversely from one side 11 to the other side 12 of the sack and is securely anchored to the upper wall 6 by stitching, or equivalent fastening means.

While the strap might be continued so as to extend about the entire circumference of the sack, it does not appear to be necessary to carry it across the bottom wall where it would be exposed to abrasion and might to some degree interfere with the dragging of the sack along the ground. The length of strap-forming material may, for example, be folded and stitched in the manner illustrated in Fig. 2. A two-ply strap so formed, of the order of 2 inches in width, has been found to provide sufficient strength. However, straps of other materials and other dimensions may be used.

In attaching the strap to the wall 6 of the sack, a portion of the strap, midway between the sides 11 and 12, is left free from the sack wall to provide the loop, handle, or suspension element 13 of predetermined, permanent size. This suspension element 13 is fast at both ends to the wall 6 and is of a size and shape sufficient, at least, to receive the hook of a weighing scale, and is preferably of a size large enough to permit the fingers of the hand to be inserted between it and the wall 6 of the sack so that the loop 13 may be used as a handle. For example, in attaching the strap to the wall 6 of the sack, the distance from the point 14 to the point 15 (between which the strap material is free from the top wall of the sack) may be approximately six inches, while the actual length of the strap material between the points 14 and 15 may be approximately 8 inches, thus providing sufficient slack in the strap material between the points 14 and 15 to enable the loop 13 to be used as a handle.

Figure 6:
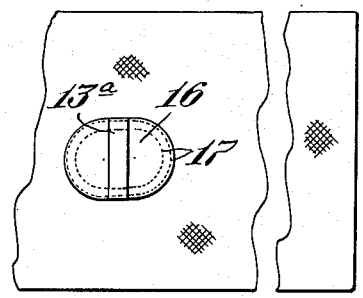
Fig. 6 is a fragmentary plan view, similar to Fig. 1, but illustrating a slight modification.
Figure 7:
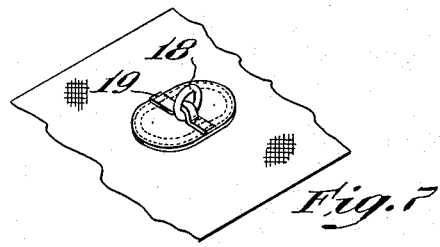
Fig. 7 is a fragmentary perspective view illustrating a further modification.

While a suspension element, such as the loop 13 just above described is desirable, other forms of suspension may be employed. For example, as illustrated in Fig. 6, the loop 13a, which may be of any suitable material, such as strong cotton tape, multi-ply duck, leather, or the like, may be attached to a wide pad 16 of strong material, for instance, multi-ply cotton duct, seamed at 17 to the top wall 6 of the sack about midway between the lateral edges of the latter. A different type of suspension element is illustrated in Fig. 7, where, instead of a fabric loop, a metal loop or ring 18 attached by a strap 19 to a pad which, in turn is seamed to the wall 6 of the sack. While the ring 18 may not be of sufficient size to function as a handle, it does provide a suspension element, having the same capability, as a support during weighing, as the fabric loop above described.

In picking cotton, the improved sack of the present invention is used in the same way as the customary type of sack, the shoulder strap 8 passing over the shoulder of the picker and the lower end portion of the sack dragging on the ground. However, if it becomes necessary to carry the partially filled sack for a substantial distance, for instance from one cotton patch to another, or to carry the filled sack to a distant weighing scales, the handle 13 is of great convenience, for by grasping the handle with one hand, as illustrated in Fig. 4, the user can at least partially lift the weight of the sack from the ground, thus lessening the difficulty in dragging the sack along and at the same time, reducing the wear on the bottom wall of the sack.

Figure 5:
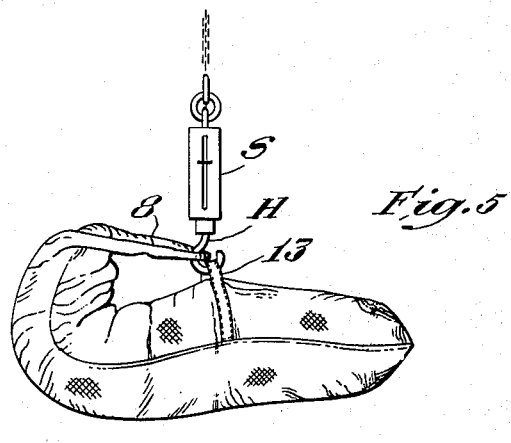
Fig. 5 is a diagrammatic elevation illustrative of the approximate shape assumed by the filled sack of the present invention when suspended, for instance, from the hook of a weighing scale.

When the filled sack is to be weighed, the loop 13 and the shoulder strap 8 (which now constitutes one of the suspension elements) are hung over the scale hook H (Fig. 5). Because of the location of the loop 13, it is not necessary to double the sack at its mid-portion in order to suspend it from the scale (which is necessary when using the customary sack) and thus the difficult operation of doubling the sack for suspending it on the scale hook is avoided. The sack of the present invention, when suspended, takes a shape in general as indicated in Fig. 5. The lower approximately ⅔ of the sack's length, wherein the cotton is usually tightly packed, is nearly horizontal and merges with the upper approximately ⅓ of the length of the sack in a bend of large radius which does not cause excessive strain of the bottom wall, it being noted that at this portion of the sack the cotton is usually looser than in the lower part, and does not oppose substantial resistance to bending.

Figure 9:
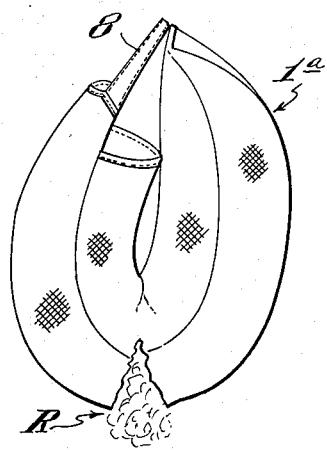
Fig. 9 is a diagrammatic elevation showing a sack of the customary type with its ends arranged adjacent to each other, as in weighing, and indicating a common occurrence resulting from the doubling of the sack in bringing its ends together.

By comparison of Figs. 5 and 8, which respectively illustrate the weighing of a filled sack according to the present invention and of the customary type of sack 1a, it may be noted as respects Fig. 8, that because the sack is doubled at approximately its mid-point, the scale hook H' must be raised from the ground a distance at least as great as one-half the length of the sack. On the other hand, with the improved sack of the present invention (Fig. 5), the major portion of the length of the filled sack (that is to say, the lower two-thirds of its length), when suspended from the hook H on the weighing scale S tends to assume a generally horizontal position such that even though the hook H be at a much lower level than the hook H' of Fig. 8 the bottom wall of the sack clears the ground. Thus, it is possible to use a tripod or other suspension for the scale S, which is substantially lower than the tripod T' necessary in weighing a sack as shown in Fig. 8, and the effort required in raising the sack and attaching it to the hook H is much less than that required in attaching the ordinary sack 1a (Fig. 8) to the more elevated hook H'. It is thus evident that by the provision of the suspension element intermediate the ends of the sack, and preferably at a distance approximately ⅓ of the way from the lower end to the upper end, it becomes possible to weigh the sack much more expeditiously than is the case when a sack of the ordinary type is employed. As already noted, when weighing the ordinary sack its opposite ends are brought together to place them over the scale hook, the sack then assuming the position illustrated in Fig. 8, for example. However, since the sack is tightly stuffed with cotton, great difficulty is experienced in bringing its ends together and excessive stress is imposed upon the lower wall of the sack so that (particularly after the sack has been in use some time and the lower wall has become worn) the lower wall will rupture at R (Fig. 9), thus requiring its replacement.

It should be noted that in attaining the above advantages it is not necessary to modify the mouth or upper end of the sack or to apply attachments thereto, nor is it necessary to employ hooks or loose, depending or dangling straps or the like, all of which if used add substantially to the cost of manufacture and interfere with the normal and customary mode of using such a sack.

In actual use, the sack of the present invention is found to have a useful life much longer than that of the usual sack, not only because of the lesser stress imposed in suspending the sack from the weighing scale, but also because the user finds it convenient to use the handle in pulling the sack along and thus reduces the abrasion of the lower wall of the sack occasioned by dragging the full weight of the sack along the ground.

While certain desirable embodiments of the invention have herein been described and illustrated by way of example, it is to be understood that the invention is broadly inclusive of any and all modifications falling within the appended claims.

We claim:

1. A cotton harvesting sack of textile fabric closed at its lower end and open at its upper end or mouth, and which comprises upper and lower walls, the open upper end being of customary flexibility and capable of being folded flat if desired, the sack having two longitudinally spaced suspension elements for use in attaching it to the hook of a weighing scale, one of said elements being the customary shoulder strap secured to the sack at its upper end, and the other being a permanent loop extending transversely of the sack and located between the lower end and the mid-point of the length of the sack.

2. A cotton harvesting sack according to claim 1, wherein the loop is located at a point approximately one-third of the way from the closed end to the open upper end of the sack, said loop consisting of a length of material having its opposite ends spaced apart transversely of the sack and permanently anchored to the sack, said loop being of a size to constitute a handle by means of which the user having the strap over his shoulder may support a portion of the weight of the sack.

3. A cotton harvesting sack closed at its lower end and open at its upper end and having a bottom wall and a top wall and having the customary shoulder strap at its upper end which may be placed over the shoulder of the user while picking cotton, a loop consisting of a length of flexible material having its opposite ends spaced apart transversely of the sack and securely and permanently anchored to the upper wall of the sack between the lower end and the midpoint of the length of the sack, said loop being of a size and shape to permit the fingers of the user to be inserted between it and the wall of the sack whereby the loop may be used as a handle for lifting the lower portion of the sack, the loop also constituting suspension means whereby, when the loop and shoulder strap are simultaneously engaged by the hook of a weighing scale, the sack will be suspended with the lower two-thirds of its length approximately horizontal.

4. A cotton harvesting sack closed at its lower end and open at its upper end having the customary shoulder strap at its upper end which may be placed over the shoulder of the user, and a flexible reinforce element extending transversely of the sack at a point between the lower end of the sack and the midpoint of the length of the sack, the reinforce element consisting of a length of the same material as that of the sack itself, said length of material being doubled to form a plurality of plies and being secured to the sack by parallel rows of stitches, the rows of stitches being so formed as to leave the mid-portion of the reinforce element free from the sack to form a permanent loop for the reception of the hook of a weighing scale.

References Cited in the file of this patent

UNITED STATES PATENTS

| | | |
|---|---|---|
| 1,172,044 | Pope | Feb. 15, 1916 |
| 1,308,263 | Smith | July 1, 1919 |
| 1,782,354 | Keene | Nov. 18, 1930 |
| 2,605,801 | Semmes | Aug. 5, 1952 |